(12) United States Patent
Leen et al.

(10) Patent No.: US 10,216,200 B2
(45) Date of Patent: Feb. 26, 2019

(54) DEVICES, METHODS, AND SYSTEMS FOR WATER BALANCING

(71) Applicant: Honeywell International Inc., Morris Plains, NJ (US)

(72) Inventors: Cary Leen, Hammond, WI (US); Andrew David Halford, Manchester, MD (US); Roy Alan Kolasa, Kansas City, MO (US); Vinay Prasad, Bangalore (IN); Jayaprakash Meruva, Bangalore (IN); Evan John Kingston, Brisbane (AU)

(73) Assignee: Honeywell International Inc., Morris Plains, NJ (US)

( * ) Notice: Subject to any disclaimer, the term of this patent is extended or adjusted under 35 U.S.C. 154(b) by 289 days.

(21) Appl. No.: 15/189,869

(22) Filed: Jun. 22, 2016

(65) Prior Publication Data

US 2017/0371357 A1 Dec. 28, 2017

(51) Int. Cl.
*G05D 7/06* (2006.01)
*G05B 15/02* (2006.01)
*H04L 12/28* (2006.01)

(52) U.S. Cl.
CPC ........... *G05D 7/0676* (2013.01); *G05B 15/02* (2013.01); *H04L 12/2816* (2013.01)

(58) Field of Classification Search
CPC ...... G05B 19/02; G05B 19/042; G05B 15/02; F24F 3/12; G05D 7/0676; G05D 7/06; H04L 12/2816; H04L 12/28

USPC ........................................................ 700/282
See application file for complete search history.

(56) References Cited

U.S. PATENT DOCUMENTS

| | | | |
|---|---|---|---|
| 2010/0147394 A1* | 6/2010 | Trnka | F24D 19/1015 137/12 |
| 2010/0274366 A1 | 10/2010 | Fata et al. | |
| 2013/0304259 A1 | 11/2013 | Meruva et al. | |

OTHER PUBLICATIONS

"KMC Connect reference", http://www.kmccontrols.com/images/com_kmcproducts/products_documents/kmc_connect_installation_reference_revb.pdf, 2015, 450 pp.

"Metasys® System Field Equipment Controllers and Related Products Product Bulletin", http://cgproducts.johnsoncontrols_com/met_pdf/12011042.pdf, Nov. 15, 2015, 37 pp.

* cited by examiner

*Primary Examiner* — Chun Cao

(74) *Attorney, Agent, or Firm* — Honeywell International Inc.

(57) ABSTRACT

Devices, methods, and systems for water balancing are described herein. An example device includes a memory and a processor configured to execute executable instructions stored in the memory. The instructions are executed to send a command from a building controller to balance a subset of a plurality of valves. The instructions are executed to simultaneously balance the subset of the plurality of valves associated with a plurality of building systems, based on the command, and without accessing any of the plurality of valves individually.

20 Claims, 7 Drawing Sheets

Figure 2

DEVICES, METHODS, AND SYSTEMS FOR WATER BALANCING

TECHNICAL FIELD

The present disclosure relates to devices, methods, and systems for water balancing related to a building management system.

BACKGROUND

Building information modeling (BIM) can refer to the generation and/or management of data associated with a building (e.g., data associated with the components, equipment, and/or properties of the building). For example, BIM data can include architectural, mechanical, electrical, plumbing, sanitary, fire, heating and/or cooling, and/or geometrical information associated with a building.

BIM data associated with a building can be used to generate a user interface for a building management system for the building, which can be displayed to a user (e.g., operator) and used to monitor and/or control the building. For example, the user (e.g., operator) of a building management system can check and/or set the state of a control component(s), equipment, device(s), network (s) area(s), and/or space(s) of the building using the user interface of the building management system.

BRIEF DESCRIPTION OF THE DRAWINGS

FIG. 2 illustrates an example system for water balancing in accordance with one or more embodiments of the present disclosure.

DETAILED DESCRIPTION

Figure 1:
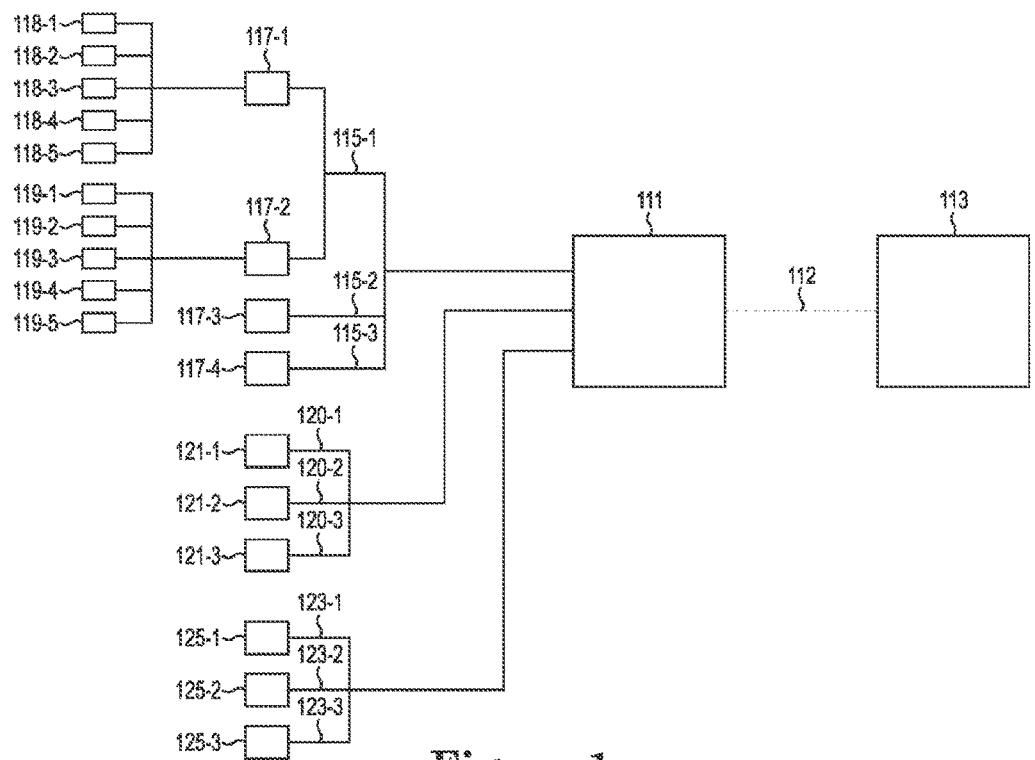
FIG. 1 illustrates an example system for water balancing in accordance with one or more embodiments of the present disclosure.

Devices, methods, and systems for water balancing are described herein. For example, one or more embodiments can include sending a command from a building controller to balance a subset of a plurality of valves. One or more embodiments can include simultaneously balancing the subset of the plurality of valves associated with a plurality of building systems. The balancing can be based on the sent command and performed without accessing any of the plurality of valves individually.

Embodiments of the present disclosure can decrease the amount of time and/or computing resources used to performing water balancing on a plurality of valves. For example, a number (e.g., a plurality) of water valves can be controlled without individually controlling each of the number of water valves. Further, the number of valves can be controlled by a user to balance water in a building system.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 115 may reference element "015" in FIG. 1, and a similar element may be referenced as 215 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of buildings" can refer to one or more buildings.

FIG. 1 illustrates an example system for water balancing in accordance with one or more embodiments of the present disclosure. The system in FIG. 1 can include a processing resource 111 (e.g., a computing system, a number of controllers and servers, etc.). The processing resource 111 can be in communication with a plurality of circuits. The plurality of circuits (e.g., circuits controlling water valves) can include a first circuit (e.g., a first boiler circuit) 115-1, a second circuit (e.g., a second boiler circuit) 115-2, and a third circuit (e.g., a third boiler circuit). The first circuit 115-1 can be in communication with a first primary valve subgroup 117-1 and a second primary valve subgroup 117-2. The second circuit 115-2 can be in communication with a third primary valve subgroup 117-3. The third circuit 115-3 can be in communication with a fourth primary valve subgroup 117-4.

The first primary valve subgroup 117-1 can include a first valve 118-1, a second valve 118-2, a third valve 118-3, a fourth valve 118-4, and a fifth valve 118-5. The second primary valve subgroup 117-2 can include a first valve 119-1, a second valve 119-2, a third valve 119-3, a fourth valve 119-4, and a fifth valve 119-5. While the first and second primary valve subgroups are described as including five valves each, examples are not so limited. For example, the primary valve subgroups can include any number of valves.

The processing resource 111 can be in communication with a second set of circuits (e.g., chiller circuits) 120-1, 120-2, 120-3 and a third set of circuits (e.g., FCU circuits) 123-1, 123-2, 123-3. Each of the second set of circuits 120-1, 120-2, 120-3 can be in communication with an additional primary valve subgroup 121-1, 121-2, 121-3. Each of the third set of circuits 123-1, 123-2, 123-3 can be in communication with an additional primary valve subgroup 125-1, 125-2, 125-3. While the circuits, primary valve subgroups, and plurality of valves are illustrated as being connected, examples are not so limited. For example, the first circuit 115-1 can be in wireless communication with the primary valve subgroup 117-1.

The processing resource 111 can be in communication, illustrated at 112, with an external device 113. The processing resource 111 can be wirelessly connected to the external device 113. The external device 113 can include a mobile device, a mobile phone, a laptop, a touchpad computer, etc. The external device 113 can be operated and/or used by a user such as a building controller, a water balancing controller, etc. In at least one example, the processing resource 111 can be in communication with the external device 113 using a private and/or public network (e.g., a public and/or private cloud). For instance, the private/public network can include a wide area network (WAN) such as the Internet, a local area network (LAN), a personal area network (PAN), a campus area network (CAN), or metropolitan area network (MAN), among other types of networks.

As used herein, a "network" can provide a communication system that directly or indirectly links two or more computers and/or peripheral devices and allows users to access resources on other computing devices and exchange messages with other computing devices and/or users. A network can allow users to share resources on their own systems with other network users and to access information on centrally located systems or on systems that are located at remote locations. For example, a network can tie a number of computing devices together to form a distributed control network.

A network may provide connections to the Internet and/or to the networks of other entities (e.g., organizations, institutions, etc.). Users may interact with network-enabled software applications to make a network selection, such as to select a plurality of valves in a primary valve subgroup (e.g., subgroup 117-1) across the network using the external device 113. get a file or print on a network printer. Applications may also communicate with network management software, which can interact with network hardware to transmit information between devices on the network.

As shown in FIG. 1, the processing resource 111 can include a processor and memory. The memory can be any type of storage medium that can be accessed by the processor to perform various examples of the present disclosure. For example, the memory can be a non-transitory compute readable medium having computer readable instructions (e.g., computer program instructions) stored thereon that are executable by processor to perform various examples of the present disclosure. That is processor can execute the executable instructions stored in memory to perform various examples of the present disclosure.

Memory can be volatile or nonvolatile memory. Memory can also be removable (e.g., portable) memory, or non-removable (e.g., internal) memory. For example, memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory. Further, although the memory is described as being located in the processing resource 111, embodiments of the present disclosure are not so limited. For example, the memory can also be located internal to another computing resource (e.g., enabling computer readable instructions to be downloaded over the Internet or another wired or wireless connection).

Figure 2:
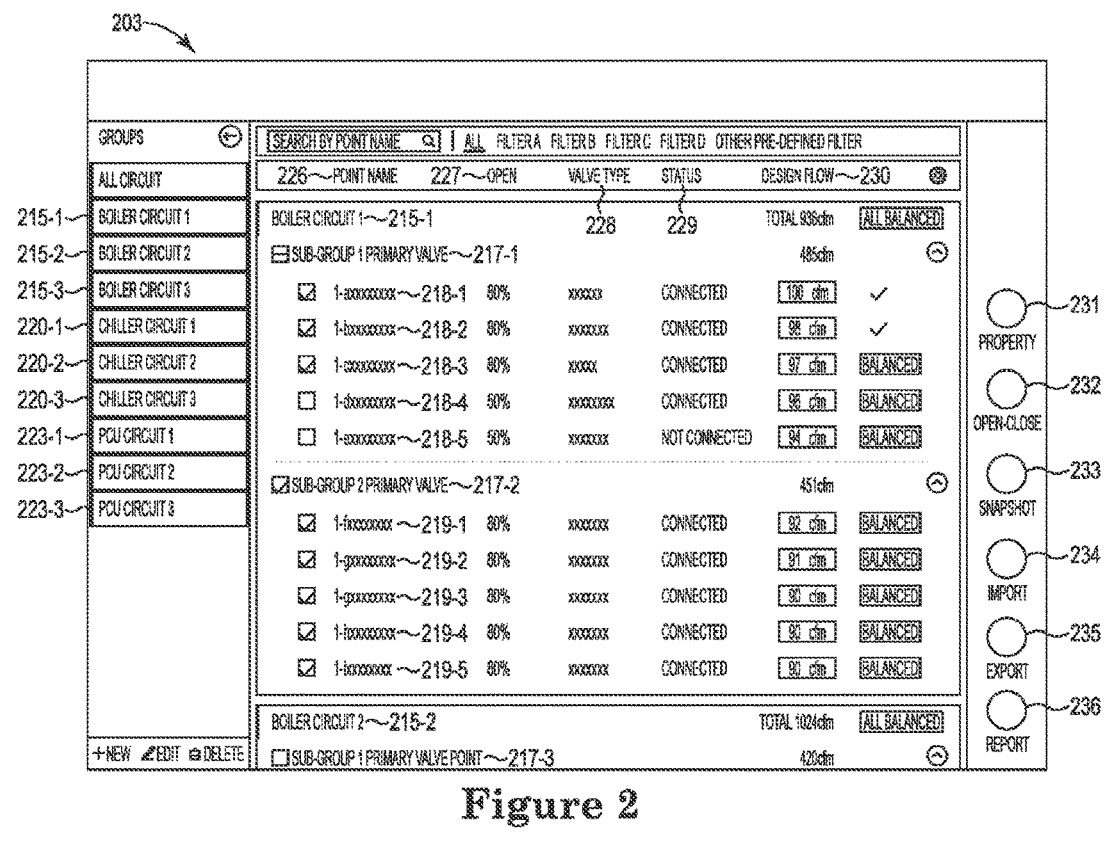

FIG. 2 illustrates an example system 203 for water balancing in accordance with one or more embodiments of the present disclosure. The system 203 includes a plurality of circuits, such as a first set of circuits (e.g., a number of boiler circuits) 215-1, 215-2, 215-3, a second set of circuits (e.g., a number of chiller circuits) 220-1, 220-2, 220-3, and a third set of circuits (e.g., a number of fan coil unit (FCU) circuits) 223-1, 223-2, 223-3. A first circuit (e.g., first boiler circuit) 215-1 can include a number of primary valve subgroups 217-1, 217-2 and a second circuit (e.g., a second boiler circuit) 215-2 can include an additional primary valve subgroup 217-3.

A first primary valve subgroup 217-1 can include a first valve (e.g., "1-axxxxxxxx") 218-1, a second valve (e.g., "1-bxxxxxxxx") 218-2, a third valve (e.g., "1-cxxxxxxxx") 218-3, a fourth valve (e.g., "1-dxxxxxxxx") 218-4, and a fifth valve (e.g., "1-exxxxxxxx") 218-5. The second primary valve subgroup 217-2 can include a first valve (e.g., "1-fxxxxxxxx") 219-1, a second valve (e.g., "1-gxxxxxxxx") 219-2, a third valve (e.g., "1-gxxxxxxxx") 219-3, a fourth valve (e.g., "1-hxxxxxxxx") 219-4, and a fifth valve (e.g., "1-ixxxxxxxx") 219-5.

As illustrated in FIG. 2, the system 203 can include an indication of a point name 226, a percentage that a valve is Open 227, a valve type 228, a valve status 229, and a design flow 230. For example, the first valve 218-1 includes a point name 226 of "1-axxxxxxxx", an open indication 227 of "80%", a valve type 228 indicated as "xxxxx", a status 229 of "Connected", and a design flow 230 indicated by "100 cfm". Design flow can refer to a flow volume at a particular instance in time. The flow volume can be indicated by cfm, which stands for cubic feet per minute.

A point can refer to a particular parameter within a water balancing system. For example, a point can refer to sensor inputs, control outputs, control values, etc. with different characteristics based on which point is being referenced. In this example, a point can be a sub-valve within a primary valve with corresponding sensor inputs, control outputs, control values, etc. That is, as an example, valves 218-1 to 218-5 are sub-valves of primary valve subgroup 217-1 and can be referred to as including points within the system 203.

Additional system 203 selections can include a property 231, an open-close indication 232, a snapshot 233, an import 234, and export 235, and a report 236. That is, the property 231 can refer to a particular property of the valves listed. The open-close selection 232 provides an indication of whether the particular valves are open or closed. The snapshot selection 233 can provide a snapshot of each of the valves and/or a snapshot of a broader system structure, such as subgroups of primary valves. The import selection 234 can provide an ability to import additional valves and/or valve listings and records into the system 203. The export selection 235 can provide an ability to export additional valves to additional systems that control valves. The report selection 236 can provide an ability to report the data related to the valves of the system 203.

Figure 3A:
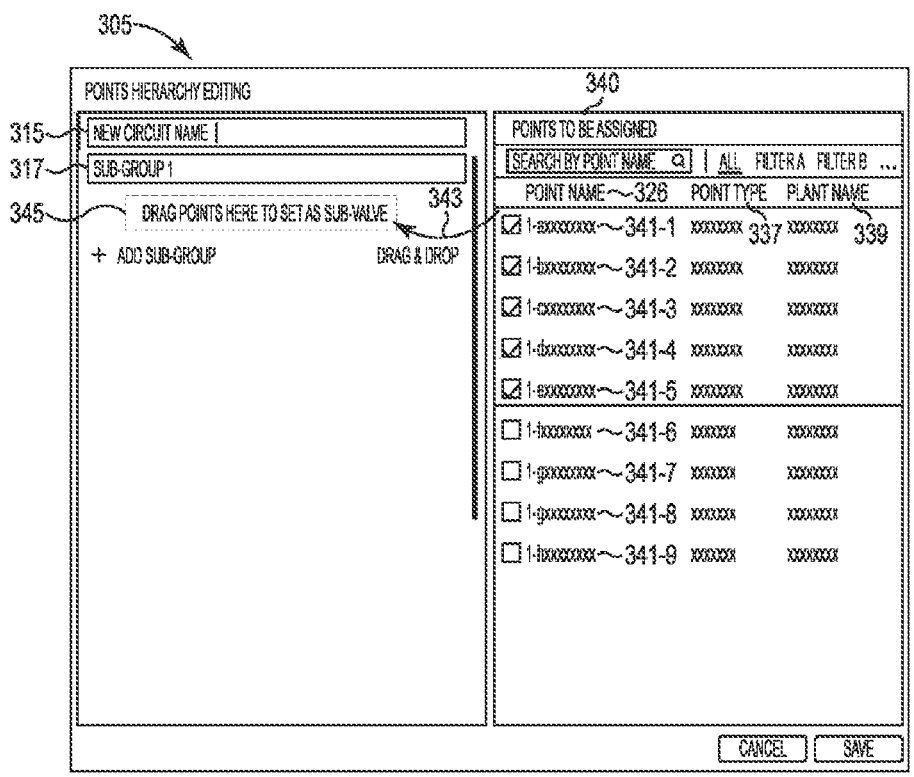
FIGS. 3A-3C each illustrate an example system for water balancing in accordance with one or more embodiments of the present disclosure.
Figure 3B:
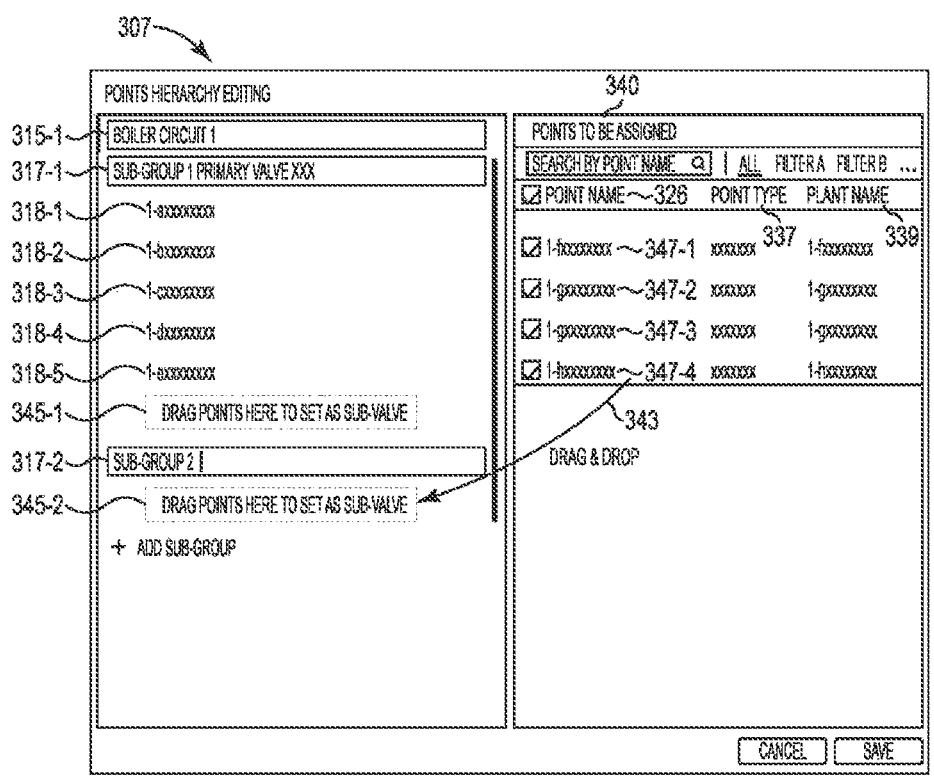
Figure 3C:
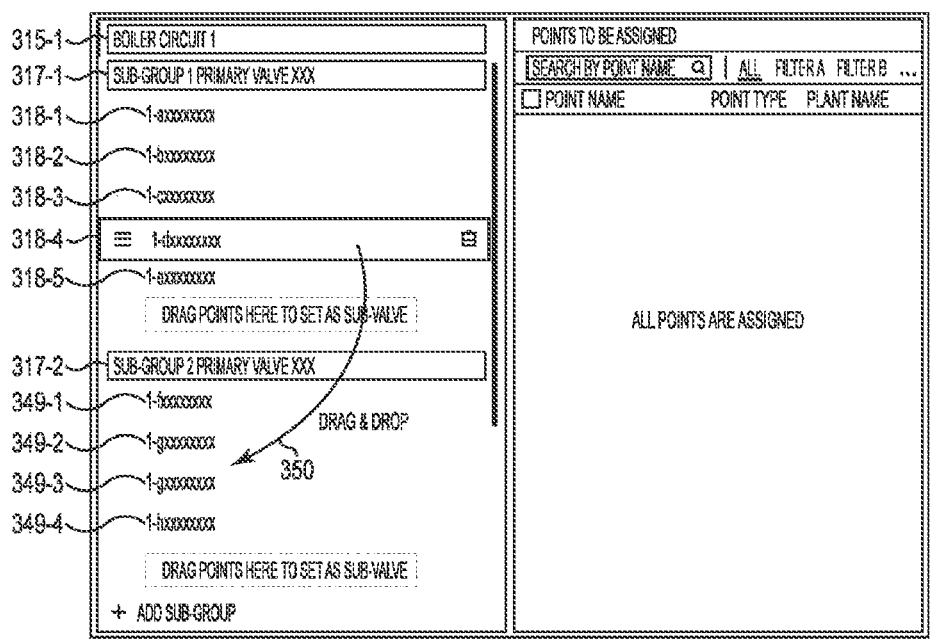

FIGS. 3A-3C each illustrate an example system for water balancing in accordance with one or more embodiments of the present disclosure. FIG. 3A is an illustration of an example system 305 for editing a points hierarchy for water balancing. The system 305 can include a new circuit name 315 where a new circuit can be inserted into the system 305. The new circuit name 315 can include a sub group 1 317 for entering additional points. A number of points to be assigned 340 can be added to the sub group 1 317. For example, a first point (e.g., valve) 341-1 can be dragged and dropped, as illustrated at 343, into a location, as illustrated at 345, to be added to the sub group 1 317.

The number of points to be assigned 340 can include a first point 341-1, a second point 341-2, a third point 341-3, a fourth point 341-4, a fifth point 341-5, a sixth point 341-6, a seventh point 341-7, an eighth point 341-8, and a ninth point 341-9. Each of the points can include a point name 326, a point type 337, and a plant name 339. The point name 326 can indicate which point is being selected. The point type 337 can indicate the type of point that is being selected. The plant name 339 can indicate which plant location the particular point is located within.

FIG. 3B is an illustration of an example system 307 for editing a points hierarchy for water balancing. The system 307 can include a boiler circuit 315-1. The boiler circuit 315-1 can include a first primary valve sub group 317-1 and a second primary valve sub group 317-2. The first primary valve sub group 317-1 can include a number of points (e.g., valves) such as a first valve (e.g., "1-axxxxxxxx") 318-1, a second valve (e.g., "1-bxxxxxxxx") 318-2, a third valve (e.g., "1-cxxxxxxxx") 318-3, a fourth valve (e.g., "1-dxxxxxxxx") 318-4, and a fifth valve (e.g., "1-exxxxxxxx") 318-5.

A number of points (e.g., valves) to be assigned 340 can be added to sub group 2 317-2, as illustrated in FIG. 3B. The points to be assigned 340 can include a first point 347-1, a second point 347-2, a third point 347-3, a fourth point 347-4, etc. At least one of the points to be assigned 340 can be dragged and dropped, as illustrated at 343, to be added, at 345-2, to sub group 2 317-2. An indication of a point name 326, a point type 337, and a plant name 339, can be illustrated in system 307.

FIG. 3C is an illustration of an example system for editing a points hierarchy for water balancing. The system in FIG. 3C can include a boiler circuit 315-1, a first sub group primary valve 317-1, and a number of points (e.g., valves) 318-1, 318-2, 318-3, 318-4, 318-5 within the first sub group primary valve 317-1. The system in FIG. 3C can include a second sub group primary valve 317-2 and a number of points (e.g., valves) 349-1, 349-2, 349-3, 349-4 within the second sub group primary valve 317-2.

In at least one example, a point 318-4 ("1-dxxxxxxxx") can be dragged and dropped, as illustrated at 350, to go from being within the first sub group primary valve 317-1 to being within the second sub group primary valve 317-2. While the examples illustrated in FIGS. 3A-3C describe a selection of a particular point (e.g., valve) to be moved from one location and/or group to a different location and/or group, examples are not so limited. For example, a particular parameter associated with the point can be selected and a number of points can be relocated based on the selection of the particular parameter. That is, movement of the points from one group to another can be based on a selection of a parameter and not necessarily based on selection of the actual point itself in the system.

Figure 4:
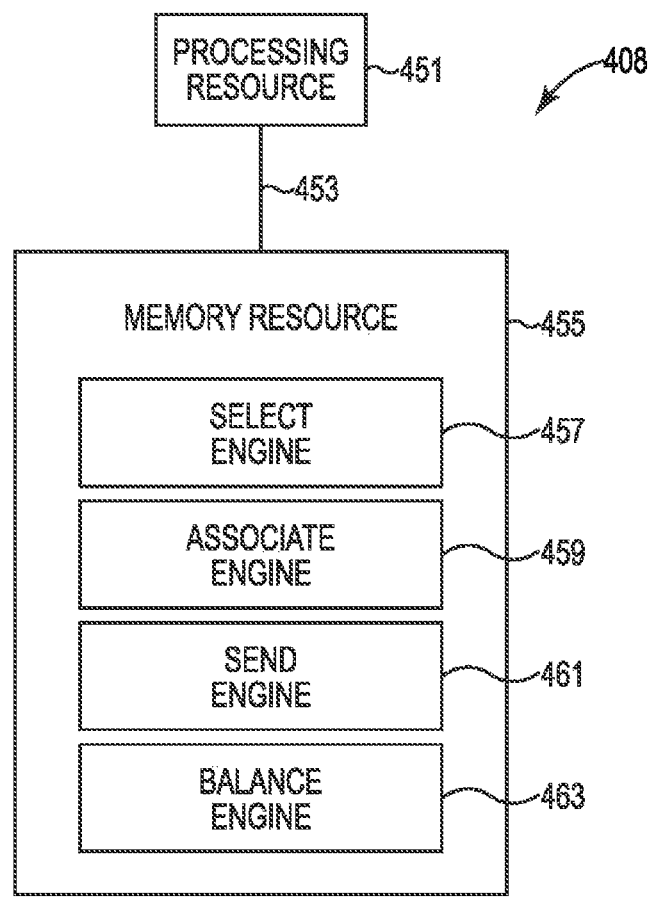
FIG. 4 illustrates an example device for water balancing in accordance with one or more embodiments of the present disclosure.

FIG. 4 illustrates an example device 408 for water balancing in accordance with one or more embodiments of the present disclosure. The device 408 can be a computing device, such as, for example, a commodity server, a data center that comprises a plurality of servers, among other types of computing devices or embedded system. The device 408 can be utilized in the system of FIG. 1, system 203 in FIG. 2, systems 305 and 307 in FIGS. 3A and 3B and the system of FIG. 3C and/or method 509 In FIG. 5 described below to perform the functions previously described herein. For example, the device 408 can be included in a mobile device in order to provide selection of a number of points and/or valves in order to provide input into the water balancing systems.

The device 408 can utilize software, hardware, firmware, and/or logic to perform functions described herein. The device 408 can be any combination of hardware and program instructions configured to share information. The hardware, for example, can include a processing resource 451 and/or a memory resource 455 (e.g., computer-readable medium (CRM), machine readable medium (MRM), database, etc.). A processing resource 451, as used herein, can include any number of processors capable of executing instructions stored by a memory resource 455. Processing resource 451 may be implemented in a single device or distributed across multiple devices. The program instructions (e.g., computer readable instructions (CRI)) can include instructions stored on the memory resource 455 and executable by the processing resource 451 to implement a desired function (e.g., select a number of valves from among a plurality of valves of a number of systems of a building, associate a selected number of valves with a particular group of valves, send a single command to balance the number of valves of the particular group, balance a selected number of valves of the particular group in response to receiving the single command).

The memory resource 455 can be in communication with a processing resource 451. A memory resource 455, as used herein, can include any number of memory components capable of storing instructions that can be executed by processing resource 451. Such memory resource 455 can be a non-transitory CRM or MRM. Memory resource 455 may be integrated in a single device or distributed across multiple devices. Further, memory resource 455 may be fully or partially integrated in the same device as processing resource 451 or it may be separate but accessible to that device and processing resource 451. Thus, it is noted that the device 408 may be implemented on a participant device, on a server device, on a collection of server devices, and/or a combination of the participant device and the server device.

The memory resource 455 can be in communication with the processing resource 451 via a communication link (e.g., a path) 453. The communication link 453 can be local or remote to a machine (e.g., a computing device) associated with the processing resource 451. Examples of a local communication link 453 can include an electronic bus internal to a machine (e.g., a computing device) where the memory resource 455 is one of volatile, non-volatile, fixed, and/or removable storage medium in communication with the processing resource 451 via the electronic bus.

A number of engines (e.g., select engine 457, associate engine 459, send engine 461, balance engine 463) can include CRI that when executed by the processing resource 451 can perform functions. The number of engines (e.g., select engine 457, associate engine 459, send engine 461, balance engine 463) can be sub-engines of other engines. For example, the select engine 457 and the send engine 461 can be sub-engines and/or contained within the same computing device. In another example, the number of engines (e.g., select engine 457, associate engine 459, send engine 461, balance engine 463) can comprise individual engines at separate and distinct locations (e.g., CRM, etc.).

The number of engines can include a combination of hardware and programming, but at least hardware, that is to perform functions described herein (e.g., locate a portion of data of a shared memory (e.g., a memristor memory) using a file pathname and a byte offset, access the located portion of the data from the shared memory, load the located portion of data into a compute node of a plurality of compute nodes using a Java Native Interface. etc.) stored in a memory resource (e.g., computer readable medium, machine readable medium, etc.) as well as hard-wired program (e.g., logic). A Java Native Interface is a programming framework that enables a particular code (e.g., Java code) to run in a particular virtual machine (e.g., a Java Virtual Machine) to call and be called by native applications and/or libraries written in other code languages.

The select engine 457 can include hardware and/or a combination of hardware and programming, but at least hardware, to select a number of valves from among a plurality of valves of a number of systems of a building. The selection can be based on an indication by a user on a wireless device (e.g., a laptop, a computer, a phone, etc. that is off-site from the building). The selection can be based on a number of criteria that is selected and the number of valves may or may not be within that selected criteria in order to be selected. The valves can be a number of different types of valves (e.g., water valves) and can select valves at a number of different locations within the water balancing system. A selection can be made without selecting a particular valve but rather a group of valves, a group of valve criteria, etc. The water balancing can include determining which valves to select based on the criteria rather than individually selecting each valve for operation.

The selection of the number of valves can occur automatically based on a number of parameters. The selection of the number of valves can occur based on a manual selection of the number of valves. The selection of the number of valves can be based on an indicated predetermined valve parameter that is determined prior to the selection being made. The valve parameter can include at least one of a particular relationship of the valve to additional valves, a type of valve, a location of a valve, and a particular system or building associated with the valve.

The associate engine 459 can include hardware and/or a combination of hardware and programming, but at least hardware, to associate a selected number of valves with a particular group of valves. The association of the selected number of valves with the particular group can be based on a selected criteria. The association can be based on a particular operation of the selected number of valves and the particular group can indicate the type of operation of the valves in the group. The association can be made without selecting an individual valve but rather providing criteria for the association to be made.

The send engine 461 can include hardware and/or a combination of hardware and programming, but at least hardware, to send a command to balance a number of valves of a particular group. The send engine 461 can send a single command to balance the number of valves and the single command can provide information for balancing without selecting a particular valve for balancing. The single command can include a particular flow volume for the particular group of valves (e.g., a cubic feet per minute (CFM) indication for each valve).

The balance engine 463 can include hardware and/or a combination of hardware and programming, but at least hardware, to balance a selected number of valves of a particular group in response to receiving a command. The received command can include a single command that balances the number of valves selected. The balancing of the number of valves can be performed without selecting an individual valve for balancing.

A number of modules (e.g., a select module, an associate module, a send module, and a balance module, not illustrated) can include instructions that when executed by the processing resource 451 can function as a corresponding one of the select engine 457, associate engine 459, send engine 461, balance engine 463, as described herein. For example, the select module can include instructions that when executed by the processing resource 451 can function as a select engine 457, the associate module can include instructions that when executed by the processing resource 451 can function as an associate engine 459, the send module can include instructions that when executed by the processing resource 451 can function as a send engine 461, and/or the balance module can include instructions that when executed by the processing resource 451 can function as a balance engine 463.

As used herein, "a" or "a number of" something can refer to one or more such things. For example, "a number of resources" can refer to one or more resources. Additionally, the designator "N", as used herein, particularly with respect to reference numerals in the drawings, indicates that a number of the particular feature so designated can be included with a number of embodiments of the present disclosure.

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Figure 5:
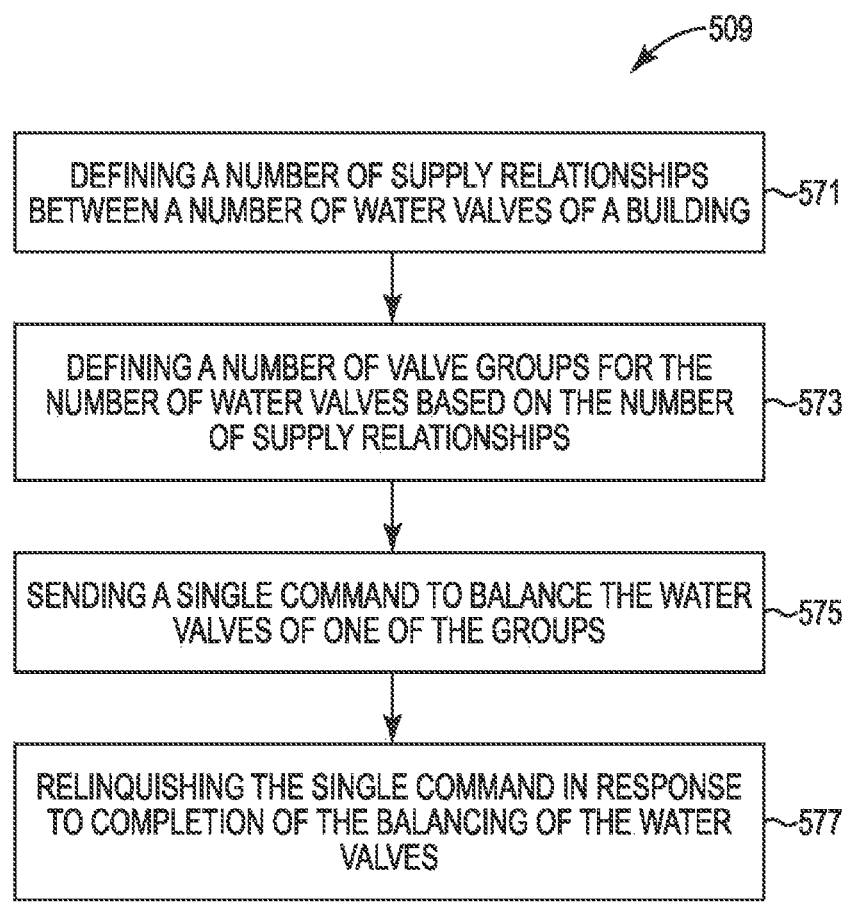
FIG. 5 illustrates an example method for water balancing in accordance with one or more embodiments of the present disclosure.

FIG. 5 illustrates an example method 509 for water balancing in accordance with one or more embodiments of the present disclosure. Method 509 can be performed by, for example, by a building management water balancing system, such as the system illustrated in FIG. 1.

The method can include, at block 571, defining a number of supply relationships between a number of water valves of a building. The supply relationships can include a particular flow volume of one valve in relation to an additional valve. The supply relationship can include a particular location of a valve in relation to other valves, etc. The defining of the supply relationships can be based on predetermined characteristics of the water balancing system. The supply relationships can be defined based on a system configuration. The supply relationships can be defined based on flow data received in real time. Defining the number of supply relationships can include defining the number of supply relationships be determining a number of building automation and control network (BACnet) points. BACnet refers to a centralized system that monitors, controls, and/or records functions of a building services system. Building facilities that are monitored and/or controlled by a BACnet can maintain a building environment more efficiently and reduce a building's environmental impact and energy costs.

The method 509 can include, at block 573, defining a number of valve groups for the number of water valves based on the number of supply relationships. The valve groups can be based on which valves provide water to which locations. The valve groups can be based on which valves are in communication with other valves. The valve groups can be based on a particular temperature and/or flow volume of the valves.

The method 509 can include, at block 575, sending a single command to balance water valves of one of the valve groups. The single command can be sent based on the defined number of supply relationships and the defined number of valve groups. For example, the single command can indicate to open and/or close valves within a particular valve group and/or a subset of valves within the particular valve group.

The method 509 can include, at block 577, relinquishing (e.g., withdrawing, terminating, disconnecting, etc.) the single command in response to completion of the balancing of the number of water valves. That is, the association of the single command with a particular valve can be terminated the particular valve can be no longer associated with an action of the single command. For example, a first valve can be operated based on a command to open. Once the valve has been opened, the command to open the first valve can be terminated and the first valve can be free to receive additional commands to the contrary. In this way, information related to operations of each valve can be relinquished after an operation is performed and data may no longer be saved to connect the command to the valve. Data space can be saved by not continually associating a framework of valve groups, valve operations, etc. with each valve.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A device for controlling a plurality of valves of a building, comprising:
   a memory; and
   a processor configured to execute executable instructions stored in the memory to:
      select a subset of valves from among a plurality of valves of a number of systems of a building based on a point of each of the number of valves, wherein each of the points comprises a characteristic of at least one of a sensor input, a control output, a control value, and a sub-valve within a primary valve;
      send a command from a building controller to balance the subset of the plurality of valves; and
      simultaneously balance the subset of the plurality of valves associated with a plurality of building systems, based on the command.

2. The device of claim 1, wherein the plurality of valves comprise a plurality of water valves.

3. The device of claim 1, wherein the command comprises a command to open at least one of the plurality of valves to one of a number of positions including fully open, fully closed, and partially open.

4. The device of claim 1, comprising selecting a group for each of the plurality of valves to be associated with for the balancing.

5. The device of claim 4, wherein a first group of the subset of the plurality of valves is adjusted to a first valve position and a second group of the subset of the plurality of valves is adjusted to a second valve position.

6. The device of claim 4, comprising disassociating each of the plurality of valves from their respective selected groups in response to the adjusting of the plurality of valves.

7. The device of claim 4, comprising indicating a total cubic feet per minute (CFM) of flow for a selected group of associated valves.

8. A non-transitory computer-readable medium having computer readable instructions stored thereon that are executable by a processor to:
   select a number of valves from among a plurality of valves of a number of systems of a building based on a point of each of the number of valves, wherein each of the points comprises a characteristic of at least one of a sensor input, a control output, a control value, and a sub-valve within a primary valve;
   associate the selected number of valves with a particular group of valves;
   send a single command to simultaneously balance the number of valves of the particular group; and
   balance the selected number of valves of the particular group in response to receiving the single command.

9. The medium of claim 8, wherein the selection of the number of valves occurs automatically based on a number of parameters.

10. The medium of claim 8, wherein the selection of the number of valves occurs based on a manual selection of the number of valves.

11. The medium of claim 8, wherein the single command includes a particular flow volume for the particular group of valves.

12. The medium of claim 8, wherein the selection of the number of valves is based on an indicated predetermined valve parameter.

13. The medium of claim 12, wherein the valve parameter includes at least one of:
   a particular relationship of the valve to additional valves;
   a type of valve;
   a location of a valve; and
   a particular system or building associated with a valve.

14. A method for valve balancing, comprising:
   defining a number of supply relationships between a number of water valves of a building;
   defining a number of valve groups for the number of water valves based on:
      the number of supply relationships; and
      a point of each of the number of valves, wherein each of the points comprises a characteristic of at least one of a sensor input, a control output, a control value, and a sub-valve within a primary valve;
   sending a single command to simultaneously balance the water valves of one of the groups; and
   relinquishing the single command in response to completion of the balancing of the water valves.

15. The method of claim 14, wherein defining the number of supply relationships comprises defining the number of supply relationships by determining a number of points.

16. The method of claim 14, wherein the number of valve groups are defined by assigning the number of water valves to a respective logical group.

17. The method of claim 14, comprising balancing the number of water valves and airflow of the building using a single building management platform.

18. The method of claim 14, comprising importing saved data associated with previous supply relationships and previously defined valve groups.

19. The method of claim 14, comprising redefining the number of valve groups based on user input.

20. The method of claim 14, comprising operating a number of water valve controllers by the sending of the single command independent of sending an additional command to each of the water valve controllers.

\* \* \* \* \*